United States Patent Office 3,758,464
Patented Sept. 11, 1973

3,758,464
PROCESS FOR PREPARING A STABILIZED BIOCIDAL COMPOSITION
Hershel B. Prindle and Jack A. McElreath, Lake Jackson, and David R. Elliott, Freeport, Tex., assignors to The Dow Chemical Company, Midland, Mich.
No Drawing. Filed Oct. 27, 1969, Ser. No. 869,901
Int. Cl. C07d 55/52
U.S. Cl. 260—248.5                9 Claims

ABSTRACT OF THE DISCLOSURE

Adducts of certain unsaturated halides with hexamethylenetetramine are known to be effective germicides when present in concentrations as low as 0.01 percent in water-containing organic mixtures. However, under certain conditions the compounds may undergo detrimental spontaneous exothermic decomposition. A composition which is stable while packaged and/or during storage is realized by the process of the present invention which comprises blending with adduct, during adduct preparation, an additament which eliminates or suppresses any self-propagating exothermic decomposition of the adduct.

BACKGROUND OF THE INVENTION

Adducts of certain unsaturated olefinic or acetylenic halides with hexamethylenetetramine are effective germicides when present in concentrations as low as 0.01 percent in water-containing organic mixtures such as, for example, emulsified cutting oils, latexes, latex paints, aqueous adhesives, hydraulic fluids and pulp dispersions used in paper-making. The adducts, the mode of their preparation, and their utility are taught in U.S. Pat. No. 3,228,829.

In particular, as disclosed in U.S. 3,228,829, adducts formed by the reaction of hexamethylenetetramine with an olefinically or acetylenically unsaturated bromide, chloride, or iodide, wherein the carbon chain contains a maximum of about eight carbon atoms, exhibit the antimicrobial activity of the unsaturated halide moiety as well as other valuable properties not exhibited by the unsaturated halide.

Unsaturated halohydrocarbons which form adducts with hexamethylenetetramine having particularly high antimicrobial activity are dihaloalkenes and haloalkenes such as propargyl bromide, propargyl chloride, 1,3-dichloropropene, 2,3-dichloropropene, 3,3-dichloropene, diiodoacetylene, and 1,4-dichloro-2-butyne.

Although, as set forth hereinbefore, these adducts are very effective antimicrobials, under certain conditions it has been found that the compounds may undergo spontaneous exothermic decomposition. This phenomenon, if it occurs, has arisen usually in those instances where the mass of an adduct is such that there is inadequate means for heat transfer from the interior of the mass to the surrounding environment. Generally, such sporadic spontaneous decomposition has been found to occur where packages or large compact piles of the compound have been stored or accumulated such as is commonly practiced in the warehousing or other inventory storage of materials. Heretofore, means for providing heat transfer to eliminate or suppress the decomposition primarily have been directed to limiting the size of the mass of the biocidal adduct in at least one dimension to provide a short heat transfer path which prevents the development of a detrimentally large temperature difference between the interior of the mass and the environment, e.g. the atmosphere and walls of a package. Conveniently, small or thin elongated shaped packages wherein large masses were not accumulated in a given location have been found to be suitable heretofore for storage.

Now, unexpectedly, we have discovered a process for preparing a composition comprising adducts of hexamethylenetetramine with an olefinic or acetylenic halide wherein autodecomposition from spontaneous exothermic reaction during storage or while packed in compact masses is entirely prevented or suppressed to a point where there is no detrimental product degradation.

Since the stabilized composition containing a suppressor additive had been previously discovered, it was quite surprising that when certain suppressor additives were added during the preparation of the hexamethylene tetramine-halohydrocarbon adduct that a substantially improved yield of the adduct was obtained.

The product prepared as above was also found to be less hydroscopic than the adduct prepared according to the known art and subsequently blended with the suppressor.

It is a principal object of the present invention to provide a process for preparing a composition comprising an adduct of hexamethylenetetramine with an olefinic or acetylinic halide which does not undergo spontaneous detrimental degradation when stored in large masses.

It is another object of the present invention to provide a process for preparing a stabilized hexamethylenetetramine-unsaturated aliphatic halide adduct containing composition wherein spontaneous exothermic decomposition of adducts of the type set forth hereinbefore can be suppressed and even eliminated thus markedly increasing the ease of bulk storage and packaging of such adducts.

It is a further object of the present invention to provide a process for preparing a composition which is stable against autoinitiated exothermic reaction of a 1:1 hexamethylenetetramine:unsaturated aliphatic halide adduct, but wherein the biocidal effectiveness of this active ingredient is not impaired.

It is yet another object of this invention to provide a process which gives improved yields of a stabilized hexamethylenetetramine-unsaturated aliphatic halide adduct.

It is a still further object of this invention to provide a process which yields a less hygroscopic product than previously obtainable.

These and other objects and advantages readily will become apparent from the detailed description presented hereinafter.

GENERAL SUMMARY

In general, the process of the present invention comprises providing a mixture of hexamethylenetetramine and a predetermined quantity of an additament compound, hereinafter at times referred to as a suppressor additive, in a quantity sufficient to eliminate or suppress any self-propagating exothermic decomposition of the adduct. The mixture is slurried in an inert carrier liquid to provide a mobile slurry and an olefinic halide or acetylenic halide adduct-former in a molar quantity to form a predetermined adduct composition is added thereto under controlled conditions and at a predetermined temperature, following completion of the addition of the unsaturated halide reactant, the reaction mass is maintained at a predetermined reaction temperature for a period of time such that formation of the adduct in substantial quantities is realized, after which the product mass is removed from the reactor, the resulting solid adduct-suppressor additive composition separated from the liquid carrier and the so-recovered composition dried.

DESCRIPTION OF PREFERRED EMBODIMENTS

In a preferred embodiment of the present process hexamethylenetetramine and a suppressor additive which is a polymeric form of an aliphatic aldehyde wherein the monomeric aldehyde has from 1 to 2 carbon atoms, alkali metal- or ammonium hydrogen carbonate, an alkali metal- or ammonium salt of a polycarboxylic aliphatic acid having a total of from 2 to about 8 carbon atoms, an alkaline earth metal oxide, e.g., magnesium oxide, or urea or its autocondensation products, e.g., biuret and triuret, are mixed in an agitated reactor in the presence of an inert organic carrier liquid, the amount of said liquid providing a final adduct-additive product slurry containing from about 20 to about 35 weight percent solids, and desirably about 30 weight percent solids.

The resulting agitated mixture is heated to a temperature of from about 25 to about 75° C., desirably from about 50 to about 70° C. and an acetylenic halide or olefinic halide in a molar quantity equal to that of the hexamethylenetetramine is controllably added thereto, while maintaining the predetermined reaction temperature. Following completion of the unsaturated aliphatic halide addition, the resulting agitated reaction mixture is maintained at the reaction temperature for a period of from about 2 to about 40 hours, preferably from about 6 to about 16 hours. Usually, within the disclosed range the reaction period varies inversely with the reaction temperature employed. Temperatures lower than that disclosed are operable but the reaction time required for formation of the product composition may be unduly lengthened. At reaction temperatures greater than about 70° C. product discoloration and possible decomposition can be encountered.

The resulting product composition comprising a solid substantially homogeneous blend of the 1:1 adduct of hexamethylenetetramine:olefinic halide or acetylenic halide together with the suppressor additive is removed from the reactor and separated from the carrier liquid by liquid-solid separatory techniques, e.g. filtration, centrifugation, vacuum drying, etc. The solid product usually is dried under a reduced pressure.

In practice it has been found that the actual quantities of additive to be employed in preparing a given composition will depend on the predetermined suppressor additive selected. Generally, from about 10 to about 90 weight percent of the additive and from about 90 to about 10 weight percent of the adduct are employed in the composition. Ordinarily, the composition range from about 15 to about 45 weight percent of the suppressor additive and from about 85 to about 55 weight percent of the adduct. Within this range it is to be understood that quantities of a particular additive greater than the minimum set forth or less than the maximum disclosed as required to obtain substantially complete suppression of the exothermic autodecomposition of a given adduct can be used.

Compositions containing the suppressor additive in amounts greater than that disclosed provide the desired suppression of the spontaneous exothermic decomposition of the adduct, but this excess is not required. In some instances, it may be detrimental in that with unduly large quantities of suppressor additive, the adduct may be undesirably diluted thereby requiring larger amounts of the composition than desired for a given antimicrobial application.

The weight proportions of solids and liquid carrier liquid in the reaction mixture and resulting product slurry can vary from that disclosed. However, with a lower solids content, the size of the reactor, material handling and transport, inventory carrier liquid volumes and the like are increased thereby increasing both the cost and manipulative complexity of the operation. With slurries containing greater than about 35 weight percent solids, the mass becomes viscous and requires increases in the power requirement and size of agitator to provide the necessary agitation to yield a substantially homogeneous product blend.

The drying of the solid composition is carried out within a temperature range of from about 25° C. to about 65° C. at an absolute pressure of from about 2 to about 27 inches of mercury but preferably at a temperature of from about 40° C. to about 55° C. at an appropriately reduced pressure. These conditions are not critical but assure rapid carrier liquid removal without encountering adduct decomposition during the drying step.

Carrier liquids ordinarily employed in the practice of the present invention are those which are solvents for the hexamethylenetetramine and the olefinic halide or acetylenic halide, and which do not undergo reaction with these reactants, the suppressor additive, the adduct or the final product composition. Conveniently, relatively low boiling organic liquids such as the halogenated alkanes, e.g. chloroform, methylene chloride and carbon tetrachloride, methanol, ethanol, tetrahydrofuran, dioxane and the like are employed.

Representative materials which have been found to be particularly suitable for use as suppressor additives in the present compositions are paraformaldehyde, sodium bicarbonate, ammonium bicarbonate, urea, magnesium oxide, ammonium citrate, biuret and s-trioxane.

The following examples will serve to further illustrate the present invention but are not meant to limit it thereto.

Example 1

A 2-gallon glass lined kettle was fitted with an adjustable speed agitator and mechanical seal, and an automatic temperature control. About 681 grams of hexamethylenetetramine, 406 grams of sodium bicarbonate and 2790 grams of methylene chloride were introduced into the reactor. These quantities were calculated to provide a final slurry having a total solids content of about 30 weight percent and a product composition containing 25 weight percent of sodium bicarbonate.

The agitator was operated at 150 r.p.m. and the reaction mixture heated to 60° C.

A mixture containing 24.2 percent 1,2-dichloropropane and 75.8 percent 1,3-dichloropropene was introduced into the top of the reactor through a rotometer at a feed rate of approximately 5 milliliters per minute feed rate. About 710 grams of the olefinic halide reactant was added over a period of about 2 hours. This quantity of the olefinic halide adduct-former provided about 5 weight percent excess of the 1,3-dichloropropene required stoichiometrically for formation of a 1:1 hexamethylenetetramine:1,3-dichloropropene adduct.

The resulting mixture was maintained at 60° C. under agitation for a period of about 6 hours. Ionic chloride analysis of a product sample after this reaction period showed 92 percent conversion to the adduct. Agitation at the indicated reaction temperature was continued for an additional two hours after which time the product mass was removed from the reactor.

The solid product composition was separated from the carrier liquid and dried at a temperature of about 60° C. at an absolute pressure of about 27 inches mercury for about 8 hours.

Product yield was substantially quantitative. The resulting product was a white to cream colored particulate solid having a bulk density of from about 0.6–0.8 gram/cubic centimeter.

The suppressor activity of the additive containing composition was determined by placing 8 grams of the composition along a 4 inch section of an insulated trough 6 inches long. The remaining 2 inch section of the trough was loaded with 4 grams of 1:1 hexamethylene:1,3-dichloropropene adduct. The tip of an electric soldering gun was inserted into the end of the section of adduct which was remote from the interface of the two samples to initiate combustion or exothermic decomposition of the adduct. The behavior of both the adduct and the suppressor additive containing composition was observed.

Rapid propagation through the length of the adduct with complete degradation occurred. The decomposition stopped completely at the interface of the adduct and the suppressor additive containing composition. No visible decomposition of the latter composition could be seen.

Example 2

A 5-neck, 2-liter flask equipped with a chilled water condenser with drying tube, dropping funnel, heating mantel with automatic heat control, thermometer and air-driven stirrer was used as a reactor. Predetermined quantities of hexamethylenetetramine, a suppressor additive material and methylene chloride were added to the reactor and the solution was heated to 40° C. A mixture containing 24.2 percent 1,2-dichloropropane and 75.8 percent 1,3-dichloropropene, in an amount sufficient to provide 10 weight percent excess of that required stoichiometrically for preparation of a 1:1 hexamethylenetetramine:1,3-dichloropropene adduct, was added slowly through the dropping funnel. Following completion of the olefinic halide addition, the reaction mixture was agitated while maintaining the reaction temperature at 40° C. until an ionic chloride analysis corresponding to at least 94 percent conversion to the adduct was reached.

The solid product containing slurry was removed from the reactor, the solid product composition separated from the carrier liquid and dried at a temperature of about 60° C. under a pressure of 27 inches mercury for a period of from about 8 to 15 hours.

Table I summarizes the mix components, quantities, and reaction conditions employed.

Each of the resulting suppressor additive compositions was tested employing the trough test described in Example 1. In every case, propagation of the adduct decomposition stopped at the interface of the adduct and the substantially homogeneous blended composition resulting from the present process.

Example 3

A number of additive-containing adduct compositions are prepared using the general procedure described and practiced in Example 2. The weight proportions of the suppressor additive and adduct in the blended compositions are summarized in Table II.

Each of the resulting compositions are found to exhibit a markedly increased resistance to self-propagated exothermic decomposition over that shown by the adduct itself.

Example 4

About 167 pounds of hexamethylenetetramine, 100 pounds of $NaHCO_3$ and 900 pounds of methylene chloride were loaded into a 200 gallon glass-lined reactor. The resulting mixture was stirred by a mechanical agitator at 60 revolutions per minute and the reactor purged three times with nitrogen. The agitated mass was heated to 65° C. and maintained at this temperature for two hours during which time 92 pounds of a mixture containing 24.2 percent 1,2-dichloropropane and 75.8 percent 1,3-dichloropropene was added thereto. The reaction mass was digested for two hours at 65° C. and an additional 90 pounds of the above mixture was added over a two hour period while maintaining a temperature of 65° C. in the stirred reaction mixture.

This reaction mixture was calculated to provide a slurry having a 30 weight percent solids content, a suppressor additive content of 25 percent based on the total composition weight of solids in the slurry. The 1,3-dichloropropene was used in an amount to provide about 105 weight percent of that required stoichiometrically for a 1:1 hexamethylenetetramine: 1,3-dichloropropene adduct.

Following completion of the 1,3-dichloropene reactant addition, the reaction mix was heated, under agitation, for an additional 6 hours at the 65° C. temperature.

The product slurry was transferred to a rotary vacuum dryer and dried for 14 hours under an absolute pressure of about 25 inches of mercury. The water jacket temperature of the dryer during the drying operation was maintained at about 75° C.

The resulting dried composition was recovered. Analysis indicated conversion to the adduct was about 95 percent.

Samples of the substantially homogeneous suppressor additive containing adduct product composition did not

TABLE I

| | Mix compounds | | Suppressor additive | | | | Reaction conditions | | |
|---|---|---|---|---|---|---|---|---|---|
| | Hexa-methylene tetramine (grams) | 1,3-di-chloro-propene[1] (grams) | Type | Grams | Percent of composition | $CH_2Cl_2$ (grams) | Solids in product slurry (percent) | 1,3-di-chloropropene feed time (hr.) | Reaction period (hr.)[2] |
| Run number: | | | | | | | | | |
| 1 | 134 | 116.5 | $NaHCO_3$ | 42.5 | 15 | 659 | 30 | 1 | 31 |
| 2 | 134 | 116.5 | Urea | 42.5 | 15 | 659 | 30 | 1 | 31 |
| 3 | 134 | 116.5 | MgO | 42.5 | 15 | 659 | 30 | 2 | 31 |
| 4 | 279 | 243 | $NaHCO_3$ | 167 | 25 | 2,220 | 24 | 3.5 | 16.5 |
| 5 | 134 | 117.5 | Biuret | 80 | 25 | 746 | 31 | 2 | 18.5 |
| 6 | 134 | 117.5 | MgO | 80 | 25 | 746 | 31 | 2 | 18.5 |
| 7 | 134 | 116.5 | Urea | 80 | 25 | 746 | 30 | 1.5 | 31.5 |
| 8 | 13.95 | 11.05 | $NaHCO_3$ | 225 | 90 | 584 | 30 | 0.17 | 31.5 |
| 9 | 13.95 | 11.05 | Urea | 225 | 90 | 584 | 30 | 0.17 | 31.5 |
| 10 | 13.95 | 11.05 | MgO | 225 | 90 | 584 | 30 | 0.17 | 31.5 |

[1] Actual weight.
[2] After 1,3-dichloropropene addition was completed.

TABLE II

| | Hexamethylenetetramine adduct | | Suppressor additive | |
|---|---|---|---|---|
| Composition number | Aliphatic halide moiety | Wt. percent | Type | Wt. percent |
| 1 | 1,3-dichloropropene | 80 | Ammonium bicarbonate | 20 |
| 2 | Propargyl bromide | 75 | Dibasic ammonium citrate | 25 |
| 3 | Diiodoacetylene | 85 | S-Trioxane | 15 |
| 4 | 1,3-dichloropropene | 90 | Paraformaldehyde | 10 |
| 5 | Propargyl chloride | 70 | Potassium bicarbonate | 30 |
| 6 | 1,3-dichloropropene | 60 | Calcium oxide | 40 |
| 7 | Propargyl bromide | 55 | Sodium bicarbonate | 45 |
| 8 | 2,3-dichloropropene | 75 | do | 25 |
| 9 | 1,3-dichloropropene | 40 | Calcium carbonate | 60 | undergo any visible decomposition when subjected to the trough test.

The following example illustrates the improved yields provided by the process of the present invention.

Example 5

(A) Preparation according to the known art: Into a reactor was placed 4000 pounds of hexamethylenetetramine in 16,000 pounds of methylene chloride and the reactor and contents were then purged with nitrogen gas and heated to 65° C. To this was added, over a six hour period 3960 pounds of a mixture containing 20% 1,2-dichloropropane and 80% 1,3-dichloropropene. Following this addition the reaction mixture was digested for six hours at 65° C. and then cooled to 30° C. and finally transferred to a rotary vacuum dryer and dried for 10 hours using a liquid heat exchange medium maintained at 80° C. and at an absolute pressure of 25 inches of mercury. The product analysis showed 91.6 percent conversion of hexamethylenetetramine to active adduct.

(B) Preparation according to the present invention: Into a reactor was placed 3000 pounds of hexamethylenetetramine, 1800 pounds of sodium bicarbonate and 16,500 pounds of methylene chloride. The reactor and contents were then purged with nitrogen gas and heated to 65° C. To this was added 2970 pounds of a mixture containing 20 percent 1,2-dichloropropane and 80 percent 1,3-dichloropropane over a six hour period. Following this addition the reaction mixture was digested for six hours at 65° C. and then cooled to 30° C. and finally dried in a rotary vacuum dryer for 10 hours using a liquid heat exchange medium maintained at 80° C. and at an absolute pressure of 25 inches of mercury. The analysis of this product showed 97.9 percent conversion of hexamethylenetetramine to the active adduct.

In the above two experiments the proportions of hexamethylenetetramine to 1,3-dichloropropene were identical.

A series of similar runs was made in the manner of Example 5A (six runs) and Example 5B (six runs) which gave average conversions of 90.90 and 95.75, respectively.

The following example shows the difference in hydroscopicity, as measured by the weight of water absorbed under a given humidity.

Example 6

Samples of hexamethylenetetramine - 1,3 - dichloropropene adduct which were prepared in the manner of Examples 5(A) and (B) above were dried to constant weight under vacuum. A weighed quantity (Sample 1) of the adduct prepared in the manner of Example 5(A) was placed in a flat dish. A second weighed quantity (Sample 2) of the same adduct preparation was dry-blended thoroughly with an amount of sodium bicarbonate to provide a sample containing 25% by weight of that suppressor additive and placed in a similar container. A third weighed quantity (Sample 3) of the adduct prepared in the manner of Example 5(B) (which contained 27% by weight sodium bicarbonate by analysis) was placed in a third similar container. All three samples in their containers were placed in an atmosphere maintained at a constant relative humidity of 54 percent. Each container was weighed at hourly intervals. Results of this test are shown in tabuluar form below.

| Time (hrs.) | Sample 1 | | Sample 2 | | Sample 3 | |
| --- | --- | --- | --- | --- | --- | --- |
| | Wt.(g.) | Percent water | Wt.(g.) | Percent water [1] | Wt.(g.) | Percent water [1] |
| 0 | 27.67 | | 27.80 | | 28.00 | |
| 1 | 28.23 | 2.02 | 28.23 | 2.06 | 28.20 | 0.98 |
| 2 | 28.42 | 2.71 | 28.35 | 2.64 | 28.25 | 1.22 |
| 3 | 28.52 | 3.07 | 28.42 | 2.97 | 28.27 | 1.32 |
| 4 | 28.62 | 3.44 | 28.48 | 3.26 | 28.28 | 1.37 |
| 5 | 28.70 | 3.73 | 28.48 | 3.26 | 28.28 | 1.37 |

[1] Percent water is based on actual weight of adduct present.

We claim:
1. A process for preparing a stabilized hexamethylenetetramine-unsaturated aliphatic halide adduct-containing composition which comprises:
providing a slurried mixture in an inert carrier liquid of hexamethylenetetramine and a suppressor additive, said additive being a compound which undergoes an endoethermic change at a temperature below that at which spontaneous exothermic decomposition of said adduct is initiated, and selected from the group consisting of
  (a) a polymeric form of formaldehyde or acetaldehyde,
  (b) an alkali metal- or ammonium hydrogen carbonate,
  (c) an alkali metal- or ammonium salt of a polycarboxylic lower alkylene acid having a total of from 2 to about 8 carbon atoms,
  (d) an alkaline earth metal oxide,
  (e) urea, and
  (f) biuret,
said suppressor additive being present in a quantity sufficient to suppress self-propagating exothermic decomposition of an adduct of said hexamethylenetetramine and an unsaturated aliphatic halide,
adding an unsaturated aliphatic halide having two to about eight carbon atoms selected from the group consisting of a dihaloalkene and a haloalkyne, the halogen of which has an atomic number from 17 to 53 inclusive, to said slurried mixture in an amount sufficient and for a time sufficient to provide a 1 to 1 adduct of said hexamethylenetetramine and said unsaturated aliphatic halide while maintaining said slurried mixture under agitation and at a temperature between about 25° C. and about 75° C., and
separating the resulting product composition of said adduct and said suppressor additive from said carrier liquid.

2. The process as defined in claim 1 wherein the reaction mixture is maintained under agitation at a temperature of from about 50° to about 70° C. for a period of from about 10 to about 16 hours.

3. The process as defined in claim 1 wherein the amount of suppressor additive is such to provide a final product composition containing on a weight basis from 10 to about 90 weight percent of said suppressor additive and from about 90 to about 10 weight percent of said adduct.

4. The process as defined in claim 3 wherein said final product composition contains on a weight basis from about 15 to about 45 weight percent of said suppressor additive and from about 85 to about 55 weight percent of said adduct.

5. The process as defined in claim 1 wherein the amount of inert carrier liquid is sufficient to provide a slurry containing from about 20 to about 35 weight percent solids.

6. The process as defined in claim 1 and including the step of drying the product composition at a temperature of from about 25° to about 65° C. at an absolute pressure of from about 2 to about 27 inches of mercury.

7. The process as defined in claim 1 wherein the suppressor additive is sodium bicarbonate and the unsaturated aliphatic halide is 1,3-dichloropropene.

8. A composition comprising
  (a) from about 10 to about 95 weight percent of a 1 to 1 adduct of hexamethylenetetramine and an olefinic halide or acetylenic halide having two to about eight carbon atoms selected from the group consisting of a dihaloalkene and a haloalkyne, the halogen of which has an atomic number of 17 to 53 inclusive, and (b) from about 90 to about 5 weight percent of alkaline earth metal oxides.

9. The composition as defined in claim 8 wherein said adduct is a 1:1 hexamethylenetetramine:1,3-dichloropropene adduct and wherein said suppressor additive is magnesium oxide.

References Cited
UNITED STATES PATENTS
3,228,829  1/1966  Wolf et al. _____ 260—248.5 X JOHN M. FORD, Primary Examiner